L. LINDEN.
TREATING LIQUIDS.
APPLICATION FILED MAR. 4, 1914.
1,194,646.
Patented Aug. 15, 1916.
2 SHEETS—SHEET 1.
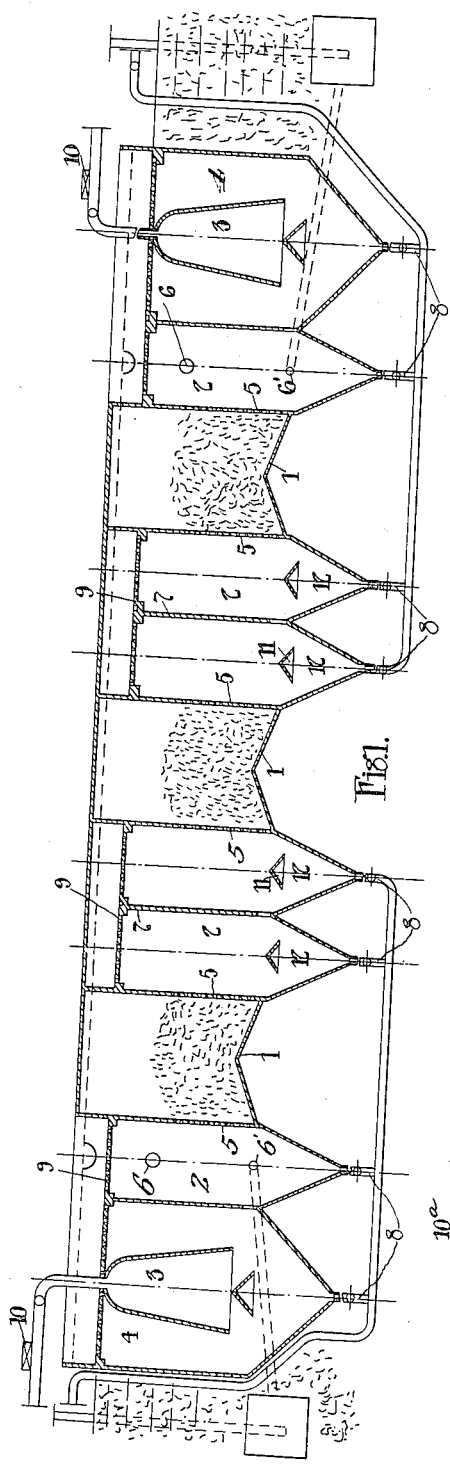
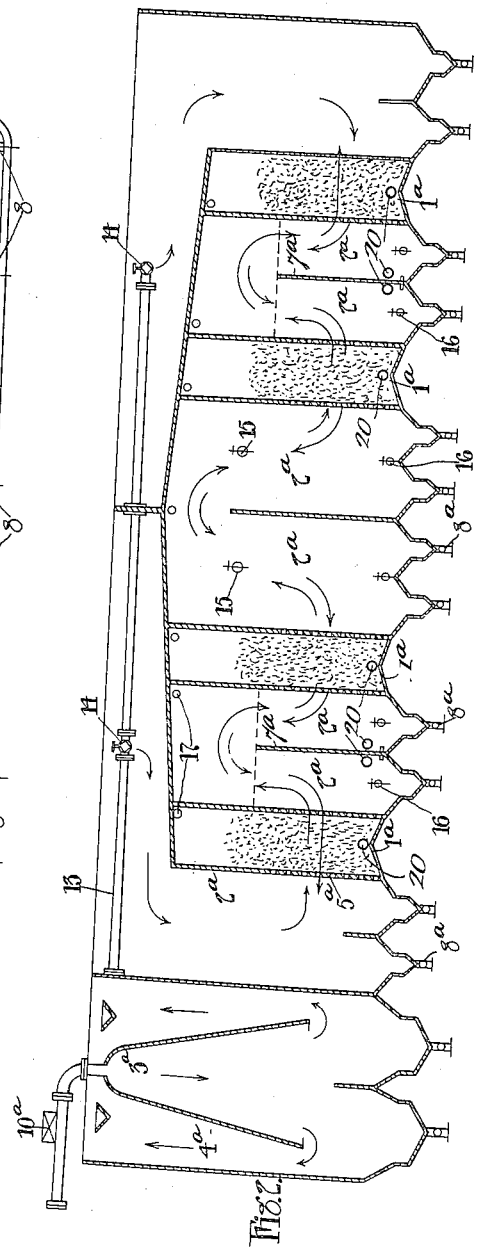
WITNESSES:
INVENTOR
Lucien Linden
BY
ATTORNEYS

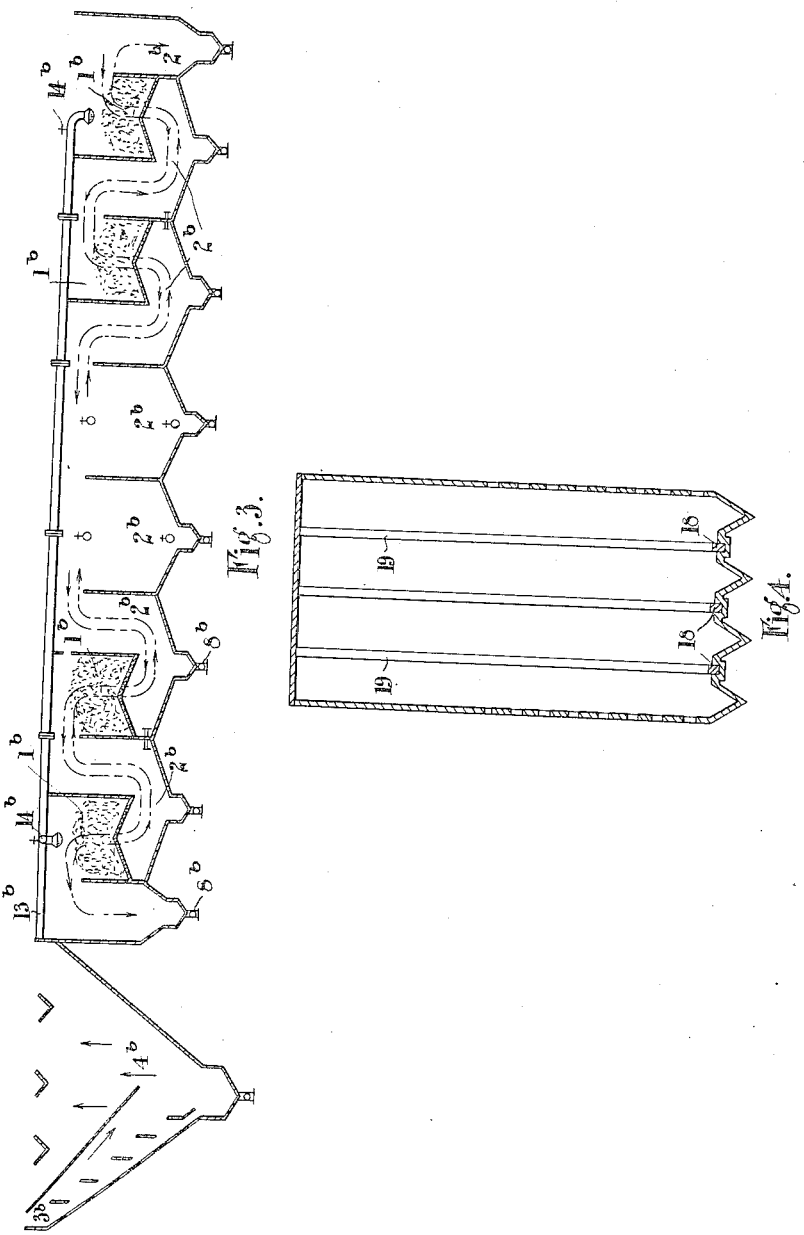

UNITED STATES PATENT OFFICE.

LUCIEN LINDEN, OF BRUSSELS, BELGIUM, ASSIGNOR TO WILLIAM J. STEWART, OF BELFAST, IRELAND.

TREATING LIQUIDS.

1,194,646.  Specification of Letters Patent.  Patented Aug. 15, 1916.

Application filed March 4, 1914. Serial No. 822,484.

*To all whom it may concern:*

Be it known that I, LUCIEN LINDEN, a subject of the King of Belgium, and a resident of 117 Rue Belliard, Brussels, Belgium, have invented certain new and useful Improvements in Treating Liquids, of which the following is a specification.

This invention relates to improved methods and apparatus applicable to the cleansing, filtration, sterilization and similar treatment of liquids and especially of water supplies, such methods and apparatus involving the employment of filters of the kind in which, as is already known, the cleansing is effected by reversal of flow. It is a serious disadvantage of filters of this kind that the supply from the filter has to be interrupted during cleansing operations and it is the particular object of the present invention to overcome this disadvantage, other objects being to secure a filtering plant of great efficiency, involving but little labor cost and occupying a relatively small area.

This invention consists broadly in providing upon either side of the filter a decantation or settling element within which matters washed from the filter can deposit and so do not pass away with the water, it being preferable to employ two sets of filtering and settling elements with a common outlet chamber for filtered liquid or otherwise so interconnected that only filtered water is present on the normal outlet side of the filter or last filter of each set even when one of them is being cleaned.

In the accompanying diagrammatic drawings are indicated by way of example various forms in which the invention can be carried into effect.

In Figure 1 is shown a form in which cleansing is effected by reversal of flow through the whole series of filtering elements. Fig. 2 shows a preferred form in which two series of filtering elements with central outlets are provided and filtration occurs horizontally through filtering beds. Fig. 3 shows a form similar to that indicated in Fig. 2 but in which filtration occurs vertically through the filtering beds and Fig. 4 shows an alternative form of filtering medium.

In Fig. 1 are shown filters 1 and settling chambers 2 on each side of the filters. The latter are preferably deeper than the filters 1 and the lower parts 12 thereof are separated from the portion in which the water flows by a baffle 11 of inverted V shape, occupying some two-thirds of the width and having for their object to keep the liquid in the lower region still and prevent deposited matter from being stirred up by liquid flowing through the settling chamber.

The water enters preferably under pressure at one of the extremities of the system at 3 having, if desired, had a suitable reagent added thereto from the container 10 and having deposited the coarser of its impurities in tank 4, overflows into the first settling tank 2 and from there through orifices 5 in the lower part of the wall into the first filter element but which it traverses horizontally. The water then passes successively in the same way through the diverse elements of the plant to leave eventually at 6 toward the top of the last settling tank during normal working or at 6' if it is desired to draw off the purified water before reversing the current.

The settling tanks 2 can consist of a single compartment through which the water flows horizontally, or are preferably divided into two compartments by a partition 7 the water being then compelled to rise in one of these compartments and to descend in the next or inversely during its passage from one filter to the next, the number of the compartments and their shape varying, of course, as desired. An opening normally closed may be provided in the lower portion of this partition for use in drawing off the purified liquid before reversing the current.

It will be understood that if it is desired to cleanse the filter it will suffice to reverse the flow by introducing the water at the opposite extreme of the apparatus. The water will then expel in its flow the impurities which have become deposited upon the surface which was formerly the entrance to the filtering bed and is during cleansing the exit from the filtering bed. These impurities passing into the adjacent chamber 2 become deposited therein and can be withdrawn through outlets 8 provided in the lower portions of the chambers.

The filtering chambers are not entirely filled with filtering material leaving a certain water space above the mass so that when the filter is emptied the contained quantity of water exerts a cleansing action by flowing through the filtering mass in a direction different to that of the normal flow or of the reversed flow. The orifices 5 are restricted to the lower part of the filter walls for this purpose.

Surface filtering frames 9 which may, if desired, be made removable can be applied at the surface of the chambers 2 to prevent, if necessary, the carrying over of impurities detached from the filters and to oblige them to redescent toward the lower and calmer portions of the chambers 2. The different compartments of the system are preferably closed at their upper extremities in such a manner as to permit of the liquid therein being maintained under the supply pressure which pressure can be varied according as it is desired more or less to accelerate the flow through the filtering and settling chambers. Experience has shown, however, that it is preferable, in most cases, to arrange for the liquid to leave toward the middle of a duplicated set of filters and settling chambers so that the purified liquid on no occasion requires to pass through a chamber which at another time may receive foul liquid and may remain contaminated thereby. Such arrangements are indicated in Figs. 2 and 3. Fig. 2 is the preferred of these two forms and comprises, as before, an entry $3^a$ for the liquid which may or may not as desired have added to it a reagent from the container $10^a$. This entry delivers into a settling tank $4^a$ from which the liquid passes through the supply pipe 13 to the two supply valves 14 of the different portions of the installation which latter include settling chambers $2^a$, filtering chambers $1^a$, draw-off appliances $8^a$, perforated grids $5^a$ and partitions $7^a$, all as before. The central settling chambers $2^a$ are, however, both provided with outlets 15 at their upper parts and are placed in communication; drain outlets 16 are also provided in the settling chambers $2^a$.

In operation, as indicated by the arrows on the drawing, the water normally enters at both ends of the system and leaves by the outlets 15 in the center but if it is desired to effect cleansing of one of the sections the flow in that section is reversed and clean liquid which has passed through the other series of filters then passes through the portion of the installation being cleaned. In this way only cleansed water ever passes into the settling chambers nearest the normal exits so that the chances of contamination are materially reduced. If desired, aeration of the liquid undergoing treatment may be effected by bubbling air through the liquid in the filtering and settling chambers which may be accomplished by supplying air under sufficient pressure to perforated tubes 20, situated at the lower extremities of the chambers, the air being permitted to escape through the upper portions of these chambers as, for instance, at the points 17 connected to suitable gas outlet pipes. If desired in cleansing the flow may be interrupted entirely in one of the sections in order to allow of slow settling of impurities while the other section still maintains a certain supply of pure water, and generally speaking by the use of the two sections as indicated a relatively great ease of control and convenience in working is obtained.

Fig. 3 shows a form of apparatus in which the filtering media are so disposed that the flow of the liquid through the filtering surface is vertical and the form shows the settling tank $4^b$ which is of a somewhat different character from that indicated in the modifications previously considered.

It will be observed that the filtering material in an installation such as has been described does not require to be disturbed once it has been put into working condition. The preferred filtering medium consists of pebbles of the size of small nuts in the earlier filters, while those toward the end of the system are preferably made up with spongy iron with the object of completing filtration and advantageous also in removing disagreeable taste sometimes associated with hypochlorite sterilization or arising from other causes.

A convenient filtering medium under some circumstances is obtained by providing frames across which is stretched metallic gauze or textile material of different kinds, such an arrangement being indicated in Fig. 4 which shows a filter chamber provided with a number of such frames 18 supporting filtering material 19 introduced into it vertically and easily removable to be replaced by fresh ones when the need for replacement arises.

Having now described my invention, what I claim as new and desire to secure by Letters Patent is:—

1. A method of obtaining an increased output of purified liquid from filtering apparatus, consisting in passing the foul liquid through a filter medium alternately in opposed directions, and subjecting said liquid in each case after its passage through the medium to decantation.

2. A method of obtaining an increased output of purified liquid from filtering apparatus, consisting in dividing the liquid into two portions, passing these portions through respective filtering media, and cleansing one of the filtering media by interruption of the normal flow therethrough and sending through it in the opposite direction liquid which has already passed through the other filtering medium, and which is subsequently subjected to decantation to remove the washed-out impurities therefrom.

3. A method of obtaining an increased output of purified liquid from filtering apparatus, consisting in passing the foul liquid through filtering media arranged in series, said liquid being passed through the series of filtering material alternately in opposite directions, and subjected to decantation after leaving each filtering medium to minimize the fouling of the filtering material.

4. A method of obtaining an increased output of purified liquid from filtering apparatus, in which the foul water is passed through a filter medium of coarse pebbles alternately in opposite directions, and the filtering operation is in each case immediately succeeded by decantation to minimize the fouling of the filtering material.

5. A method of obtaining an increased output of purified liquid from filtering apparatus, in which the foul water normally is caused to flow successively through filter media of pebbles and of spongy iron, and at intervals the flow of water through these media is reversed for cleansing, the liquid being subjected to decantation after leaving each filter medium to minimize the fouling of the filtering material.

6. A method of obtaining an increased output of purified liquid from filtering apparatus, consisting in passing said liquid in succession through a settling chamber, a filter bed, and a further settling chamber, and intermittently reversing the direction of flow through the apparatus without interrupting the purifying process.

7. A method of obtaining an increased output of purified liquid from filtering apparatus, consisting in decanting the precipitable impurities from the liquid, filtering said liquid to collect in a precipitable form upon the filtering medium the other impurities, washing from said filtering material by means of said filtered liquid impurities previously collected thereon by liquid passing in the reverse direction therethrough, and decanting said liquid to complete its purification.

8. A method of obtaining an increased output of purified liquid from filtering apparatus, consisting in decanting the precipitable impurities from the liquid into pockets protected from the flow, filtering said liquids to collect in a precipitable form upon the filtering medium the other impurities, washing from said filtering material by means of said filtered liquid impurities previously collected thereon by liquid passing in the reverse direction therethrough, and decanting said washed out impurities from said liquid into pockets protected from the flow through the apparatus.

9. A method of obtaining an increased output of purified liquid from filtering apparatus, consisting in dividing the liquid into two portions passing in parallel through like sets of apparatus, comprising filters with decanting chambers upon the inlet and outlet sides thereof, and intermittently reversing the flow in one or other set, so as to pass the liquid through the two sets in series.

In testimony whereof I have signed my name to this specification in the presence of two subscribing witnesses.

LUCIEN LINDEN.

Witnesses:
CHARLES A. JOHASE,
CHARLES ROY NASMITH.